United States Patent [19]

Calfee

[11] Patent Number: 5,651,524
[45] Date of Patent: Jul. 29, 1997

[54] ADJUSTABLE DOCUMENT HOLDER FOR COMPUTER WORKSTATION

[75] Inventor: Clifford T. Calfee, Richardson, Tex.

[73] Assignee: Vu Ryte, Inc., Tyler, Tex.

[21] Appl. No.: 706,921

[22] Filed: Sep. 3, 1996

Related U.S. Application Data

[63] Continuation of Ser. No. 538,900, Oct. 4, 1995, abandoned.

[51] Int. Cl.$^6$ ............................................. B41J 11/02
[52] U.S. Cl. ............................... 248/442.2; 248/918
[58] Field of Search ........................ 248/442.2, 441.1, 248/447, 452, 454, 918; 400/718, 718.1, 718.2

[56] References Cited

U.S. PATENT DOCUMENTS

| | | |
|---|---|---|
| 726,646 | 5/1903 | Wood . |
| 1,108,687 | 8/1914 | Boorman . |
| 1,228,083 | 5/1917 | Warfel . |
| 1,700,629 | 2/1929 | Douglas . |
| 1,811,118 | 6/1931 | Fischer . |
| 2,006,887 | 7/1935 | Doherty ............................ 120/28 |
| 2,146,465 | 2/1939 | Coppock ........................... 120/28 |
| 2,306,659 | 12/1942 | Wise .................................. 187/3 |
| 2,505,814 | 5/1950 | Voorhorst ......................... 120/28 |
| 2,547,575 | 4/1951 | Gilbo ................................. 178/58 |
| 2,711,716 | 6/1955 | Ziegler .............................. 120/32 |
| 4,243,355 | 1/1981 | Singley ............................ 400/718 |
| 4,436,271 | 3/1984 | Manso .............................. 248/460 |
| 4,546,947 | 10/1985 | Gesten ............................ 248/442.2 |
| 4,635,893 | 1/1987 | Nelson ............................. 248/558 |
| 4,717,112 | 1/1988 | Pirkle .............................. 248/639 |
| 4,754,945 | 7/1988 | Diamond ...................... 248/454 X |
| 4,863,124 | 9/1989 | Ball et al. ......................... 108/28 |
| 4,893,775 | 1/1990 | Long ............................. 248/442.2 |
| 5,074,512 | 12/1991 | Gianforcaro ................... 248/442.2 |
| 5,104,086 | 4/1992 | Ramey et al. ................. 248/442.2 |

Primary Examiner—Ramon O. Ramirez
Attorney, Agent, or Firm—Dennis T. Griggs

[57] ABSTRACT

A document holder for use in supporting documents in a ergonomically correct position with respect to a video display screen and a keyboard of a computer workstation, word processor and the like. The document holder includes a generally upright transparent easel supported on a bracket for vertical adjustment with respect to the bracket. The easel support bracket is mounted on a support rail and is laterally slidable from side-to-side for positioning the easel in a selected horizontal position along a line substantially parallel to the plane of the video display screen. The easel support bracket rail member is mounted on spaced apart pivot brackets for pivoting the easel about an axis parallel to the lateral slide axis. The support brackets are mounted on trunnions disposed on opposed support arms which, in turn, are mounted on a pedestal member for sliding movement to selected working positions of the easel toward and away from the display screen and along an axis generally normal to the display screen. The support arms are supported on rail members which may be detachably connected to a pedestal member forming part of a pedestal having plural stackable pedestal members. The easel support pedestal member may be selectively positioned in the pedestal stack to also adjust the height of the document holder. Thus, the document holder is positionable along three mutually perpendicular axes and may be rotated about one of the axes to place the easel in a selected working position.

20 Claims, 4 Drawing Sheets

ADJUSTABLE DOCUMENT HOLDER FOR COMPUTER WORKSTATION

This is a continuation of application Ser. No. 08/538,900 filed on Oct. 4, 1995, now abandoned.

FIELD OF THE INVENTION

The present invention relates generally to a document holder for a computer workstation which is adjustably mountable on a pedestal for a video display unit or monitor and is adjustable about three different axes with respect to an operator attending the workstation.

BACKGROUND OF THE INVENTION

A major consideration in the use of computer workstations including word processing equipment, is the provision of an ergonomically correct support or holder for documents which are being viewed by the operator of the workstation. Document holders have been developed which are adapted to be placed to one side of the keyboard and video display unit or monitor. These holders require the operator to constantly look to the left or right to view documents supported by the holder when transferring information from the document to the computer or when comparing information on the document to that displayed on the monitor screen. Such motion can lead to eye strain and fatigue and other medical disorders because of the repeated head movements between the document and the monitor screen or the keyboard.

The long hours of work spent by certain operators of computer equipment and word processing equipment requires serious consideration of the provision of a document holder which is adjustable in such a way as to place the document in a relatively precise position over a wide range of possible positions, considering the different physical characteristics, including visual acuity, of operators using computers and word processors. This precise positioning of a document being viewed for data input or comparison requires that the document holder be adjustable toward or away from the operator, be capable of being tilted to improve line of sight and reduce glare or light reflection, be adjustable from side-to-side, and be vertically adjustable. Moreover, different types of documents being viewed may require further position adjustment with respect to an operator. Accordingly, there has been a strongly felt need for the provision of a document holder which is more "universal" with regard to its ability to be precisely positioned with respect to the computer operator than has been available in prior art document holders. It is to these ends that the present invention has been developed.

DESCRIPTION OF THE PRIOR ART

Various types of document holders have been developed for use in conjunction with keyboard equipped machines. U.S. Pat. No. 5,104,086 to Thomas B. Ramey, III, et al. and assigned to the assignee of the present invention describes a document holder having a generally vertically disposed easel which is adjustable generally vertically as well as laterally from side-to-side and is supported on a base plate which is preferably disposed beneath a computer enclosure to secure the easel against unwanted movement.

Prior to the development of the device disclosed in the Ramey, III et al. patent, document holders have been developed which are supported for pivotal movement with respect to a support adjacent one side of a keyboard and associated machine, including a video monitor. As mentioned previously, these types of document holders require substantially constant movement of the operator's head or extreme eye movement between positions for viewing a video display monitor and for viewing a document supported by the holder.

Document holders have also been developed for mounting above typewriter keyboards. However, such holders are generally not suitable for installations where a video monitor or display unit takes up a considerable amount of space directly behind a keyboard, such as in computer workstations. Moreover, as mentioned above, prior art document holders have not provided the capability for precise positioning of the document easel over a wide range of positions, which is desirable for an ergonomically correct workstation wherein a document which is being viewed by a keyboard operator while the operator is also obliged to view the video display screen. Such a range of positions should provide for correctly placing the document to minimize head and eye movement while providing for correct posture of the operator and more importantly for adjustment for individual operators having different physical characteristics and visual acuity.

SUMMARY OF THE INVENTION

The present invention provides a unique document holder, particularly adapted for use in conjunction with a computer workstation having a video display unit or monitor and a keyboard and wherein the position of the document holder may be adjusted about at least three mutually perpendicular axes and tilted about a generally horizontal transverse axis with respect to the keyboard and an operator in attendance thereat.

In accordance with one important aspect of the invention, a document holder is provided in which a document easel is supported for generally vertical movement with respect to a keyboard and an associated video display unit and wherein the easel is also supported for tilting movement about a transverse horizontal axis, sliding movement along the horizontal axis to position the document holder laterally with respect to the operator and further wherein the easel may be moved toward or away from the operator to a selected position.

The present invention further provides a document holder comprising an easel adapted to be supported generally in front of and below a viewing screen of a video display unit or monitor for movement in the above-mentioned directions with respect to the monitor and an operator in attendance thereat.

The present invention also provides a document holder having the above-mentioned features and which is adapted to be supported on a pedestal member for supporting a video display unit or monitor and, particularly, a pedestal member which may be selectively vertically positioned in a set of stacked pedestal members.

The document holder includes a unique support frame which includes a laterally slidable support bracket for a document supporting easel wherein the support bracket includes means for easy adjustment of a vertical position of the easel with respect to the support bracket and wherein the support bracket is also supported for adjusting the tilt of the easel with respect to a vertical plane. The easel support bracket is supported on a guide and support rail to provide for the lateral sliding movement of the support bracket and easel, and the guide and support rail is disposed on opposed trunnions for adjusting the tilt position of the easel and its support bracket with respect to a vertical plane. Opposed support bars for the above-mentioned easel support bracket are provided which are adapted for mounting on a pedestal for the video display unit and which are moveable relative to the pedestal to further adjust the position of the easel in a direction toward or away from an operator in attendance at a video display unit disposed on the pedestal.

The above-mentioned features of the document holder provide for precise positioning of the holder in an ergonomically correct position for a wide range of positions so as to accommodate operators using the document holder having many different physical characteristics and visual acuity. The universality of the document holder also permits using the holder with a wide range of specific styles or types of computer equipment.

Those skilled in the art will further appreciate the above-mentioned advantageous and features of the invention together with other superior aspects thereof upon reading the detailed description which follows in conjunction with the drawing.

DESCRIPTION OF THE PREFERRED EMBODIMENTS

Figure 1:
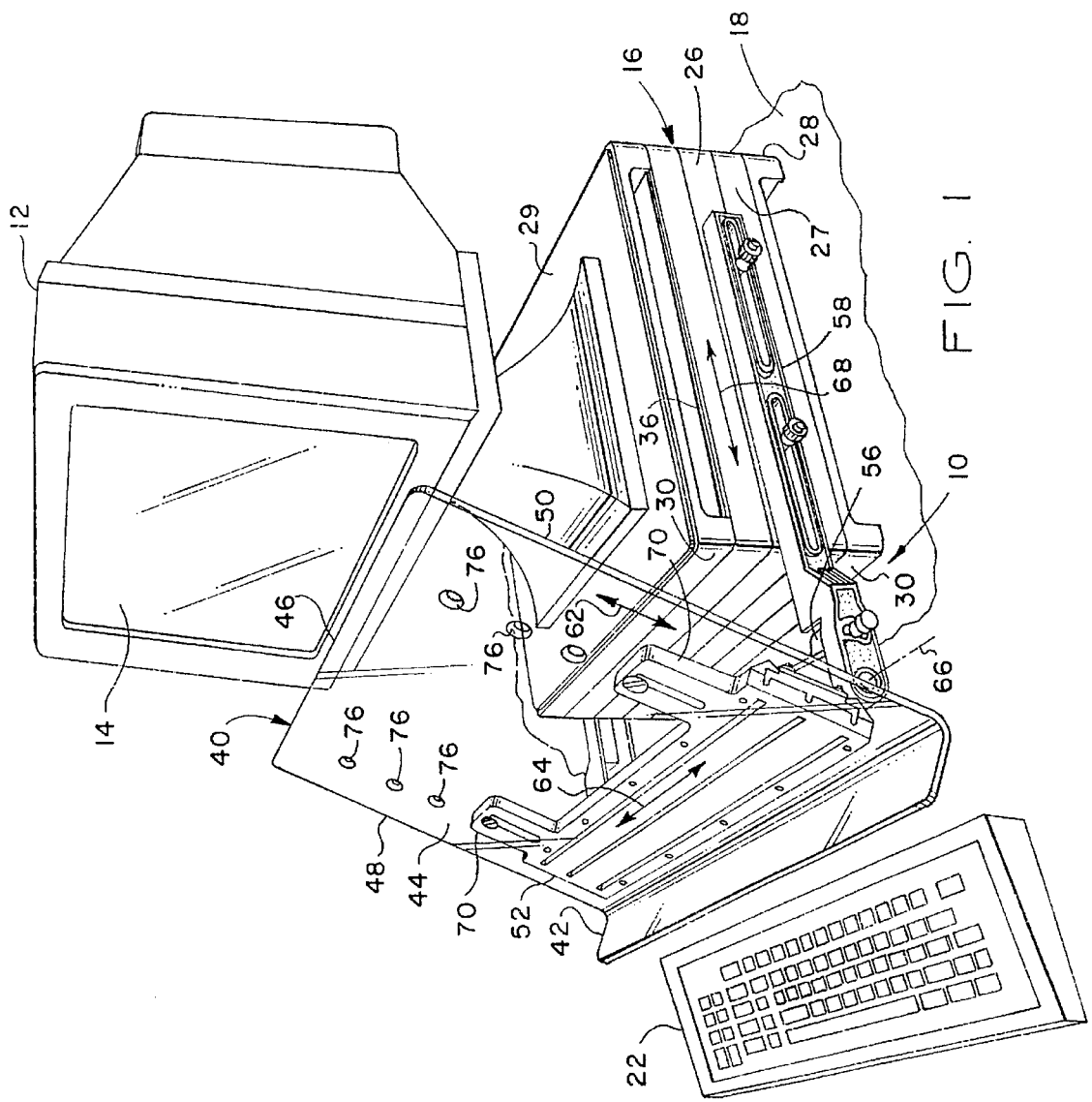
FIG. 1 is a perspective view of a computer workstation including the unique document holder of the present invention.

In the description which follows like parts are marked throughout the specification and drawing with the same reference numerals, respectively. The drawing figures are not necessarily to scale.

Figure 2:
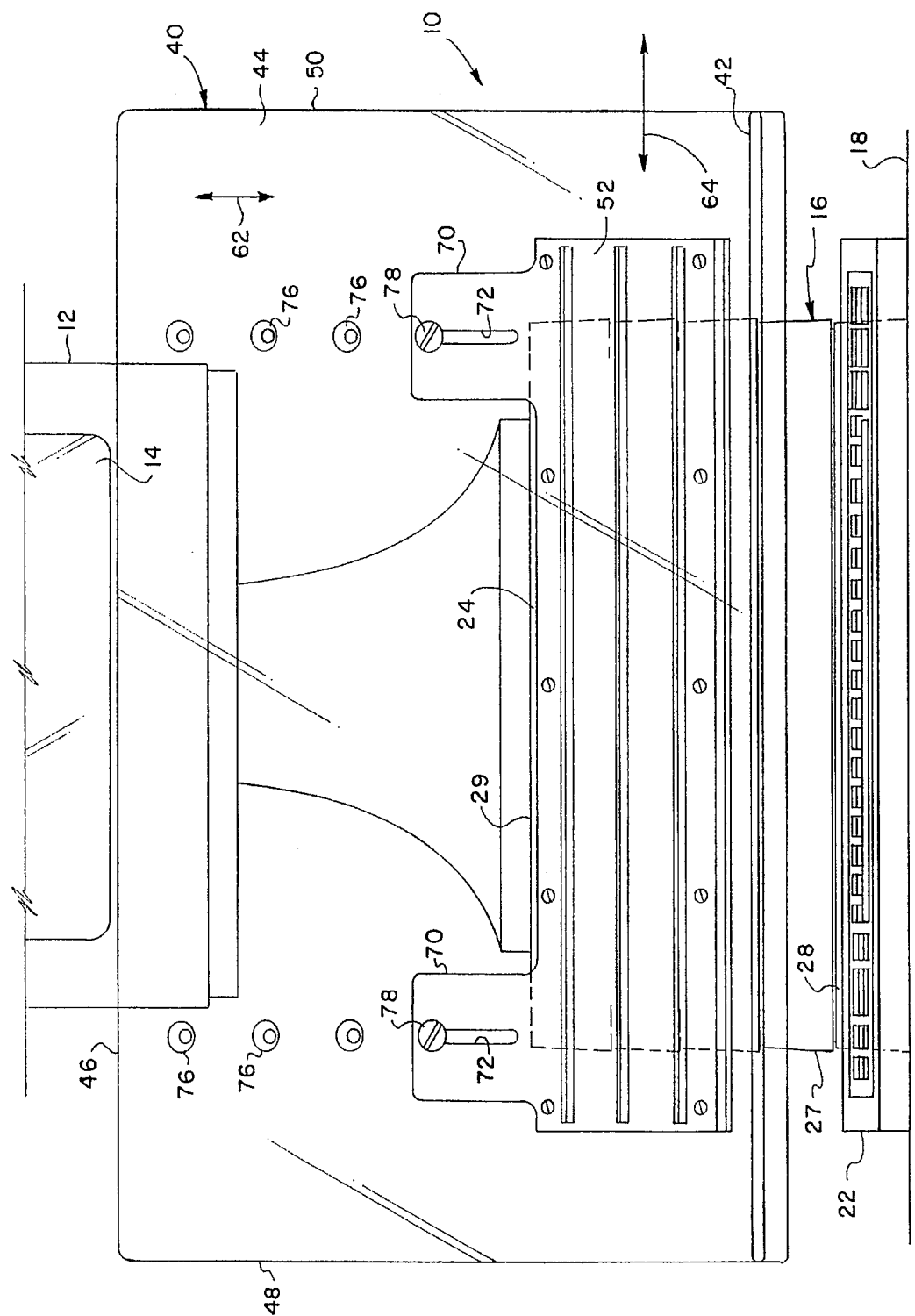
FIG. 2 is a front elevation of the workstation and document holder in accordance with the invention.

Referring to FIGS. 1 and 2, the document holder of the present invention is illustrated and generally designated by the numeral 10. The document holder 10 is particularly adapted to be used in conjunction with a computer workstation or similar apparatus having a video display unit 12 with an illuminated video display screen 14 normally disposed in a generally vertical or near vertical plane. The display unit 12 is adapted to be supported on a pedestal 16 which may be supported on any suitable generally horizontal work surface 18 which may comprise, for example, a computer cabinet. The work surface 18 may, however, be any suitable, generally horizontal surface. Installations for which the document holder 10 is particularly useful include computer workstations which comprise a remotely positionable keyboard 22 which is typically disposed in front of the video display unit 12 so that a person operating the keyboard 22 may easily view the screen 14 and may transfer data from a document to the computer or may compare data on the document with data being displayed on the screen 14. Many operations involving the use of a computer workstation, such as described above, require transferring information from a document to a computer or a similar machine or comparing information on the document with information displayed on the screen of a video display unit.

The document holder 10 is advantageously supported on the pedestal 16 which is, preferably, made up of plural, vertically stacked pedestal members 24, 25, 26, 27 and 28. The pedestal members 24, 25, 26, 27 and 28 may be substantially like the pedestal members described in my co-pending U.S. patent application Ser. No. 08/503,712, filed Jul. 18, 1995. As shown in FIG. 2, the pedestal members 24, 25, 26, 27 and 28 are each of generally rectangular configuration, have generally horizontal deck portions 29 and peripheral depending sidewalls 30, which are configured such that the pedestal members may be vertically stacked one on top of the other. In fact, each of the pedestal members 24, 25, 26, 27 and 28 has a peripheral inset forming a horizontal ledge 36, see FIG. 3, which is adapted to be engaged with support portions of the vertically depending sidewalls of another pedestal member stacked thereon.

Still further, the pedestal member 26, by way of example, is modified to support the document holder 10 in a way which will be described in further detail herein. However, a particular advantage of supporting the document holder 10 by one of the pedestal members, such as the pedestal member 26, is that the supportive pedestal member may be interchanged with either one of the other pedestal members to adjust the vertical position of the pedestal member 26 and the document holder supported thereby with respect to the support surface 18. In this way more versatile positioning of the document holder 10 in a vertical direction is provided by the pedestal 16. Although the document holder 10 may be supported by a pedestal having only one member or by other structure associated with a computer workstation, those skilled in the art will recognize that the pedestal 16 provides further universality of the arrangement of the document holder 10 for proper positioning of the document holder to the advantage of a workstation operator.

Figure 3:
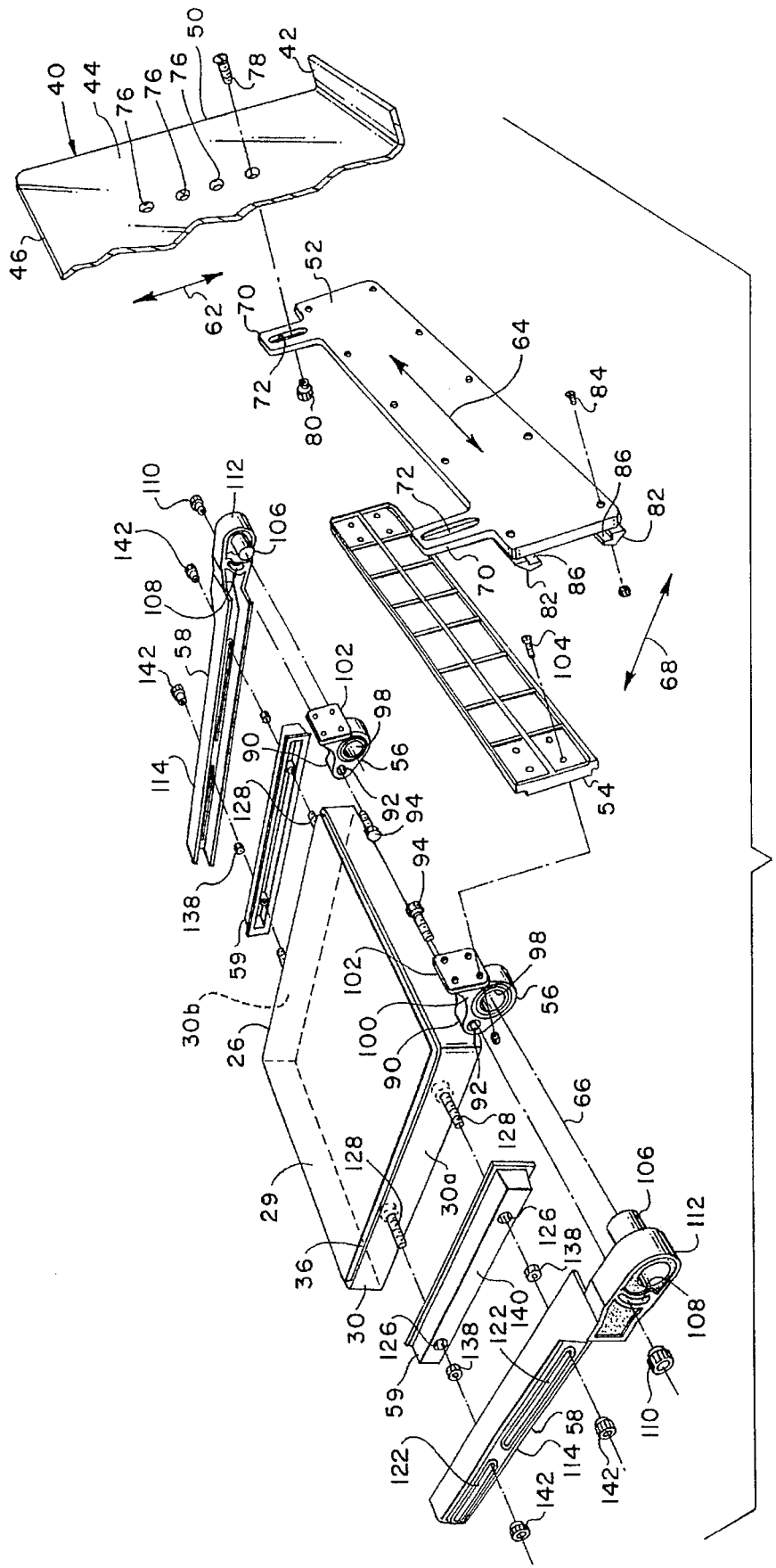
FIG. 3 is an exploded perspective view of the document holder and its component parts.

Referring further to FIGS. 1 and 2, the document holder 10 is characterized by a generally rectangular planar, plate-like easel member 40, preferably formed of a transparent plastic material. The easel member 40 has a lower lip or document holding flange part 42 which preferably extends substantially normal to the plane of a major document support portion 44 of the easel. The easel support portion 44 includes a lateral top edge 46 and opposed, generally vertical side edges 48 and 50. Referring also to FIG. 3, the easel member 40 is connected to an easel support bracket 52 which in turn is supported on an elongated generally rectangular support rail 54. The support rail 54 is connected to two spaced apart pivot brackets 56, FIG. 3, each of which is supported for rotation on opposed elongated support arms 58, respectively. The arms 58 are supported for movement toward or away from the video display unit 12 on suitable elongated support rails 59 to be described further hereinbelow and which are mountable on the pedestal member 26, for example.

A particular advantage of the document holder 10 resides in its universality of movement to a suitable position for supporting a document to be viewed by an operator in attendance at the display unit 12. In addition to being supported at a vertical position of any one of the pedestal members 24, 25, 26, 27 or 28, viewing FIG. 2, the easel member 40 may be adjusted as to its generally vertical position, as indicated by the double-headed arrow 62 in FIGS. 1 and 2, with respect to the support bracket 52. The easel member 40 may also be moved laterally in either direction along a line corresponding to the double-headed arrow 64 and with respect to the support rail 54, which line is usually parallel to the plane of the screen 14. Still further, the attitude of the easel member 40 may be adjusted about a pivot axis 66 comprising the pivot axis of the brackets 56, and the easel member 40 may be moved toward or away from the video display unit 12 along a line corresponding to the double-headed arrow 68, FIG. 1. The line of movement of the easel member 40 corresponding to the arrow 68 is normal to the axis 66 and generally normal to the axis indicated by the double-headed arrow 62, depending on the tilt of the easel member about the axis 66. Generally speaking, the easel member 40 may be adjusted about three mutually perpendicular axes, indicated by the double-headed arrows 62, 64 and 68, while the easel member may also be tilted about axis 66 which is parallel to the axis designated by arrow 64. The direction of axis 62 is dependent on the position of the bracket 52 about the pivot axis 66. Accordingly, a document supported on the easel member 40 may be positioned for optimum viewing by an operator of the keyboard 22 while the operator is also able to view the screen 14. Typically, the easel member 40 is positioned such that the operator's field of view may not require any change or to be changed only a few degrees, vertically, from viewing the center of the screen 14 to viewing the desired portion of a document supported on the easel member 40 whereby the operator may have a full view of the screen 14 deemed necessary by the operator while also having a full view of the portion of the document deemed necessary by the operator. In this regard the easel member 40, as previously mentioned, is advantageously fabricated of a transparent material including a suitable plastic or light-weight glass.

Additional structural details of the unique document holder 10 are illustrated substantially in FIG. 3. Referring to FIG. 3, the easel support bracket 52 comprises an elongated generally flat plate-like member having spaced apart upstanding tabs 70 which include parallel, elongated slots 72 formed therein, respectively. The plate portion 44 of the easel member 40 has corresponding spaced apart openings 76 for receiving threaded fasteners 78 which extend through the slots 72 and are connected to knurled manually tight enable nuts 80, respectively. Accordingly, the vertical position of the easel member 40 may be adjusted over a substantial range by moving the easel member within the slots 72 without removing the fasteners 78, or by repositioning the fasteners in any one of the openings 76 to extend the range of vertical movement of the easel member with respect to its support bracket 52.

Figure 4:
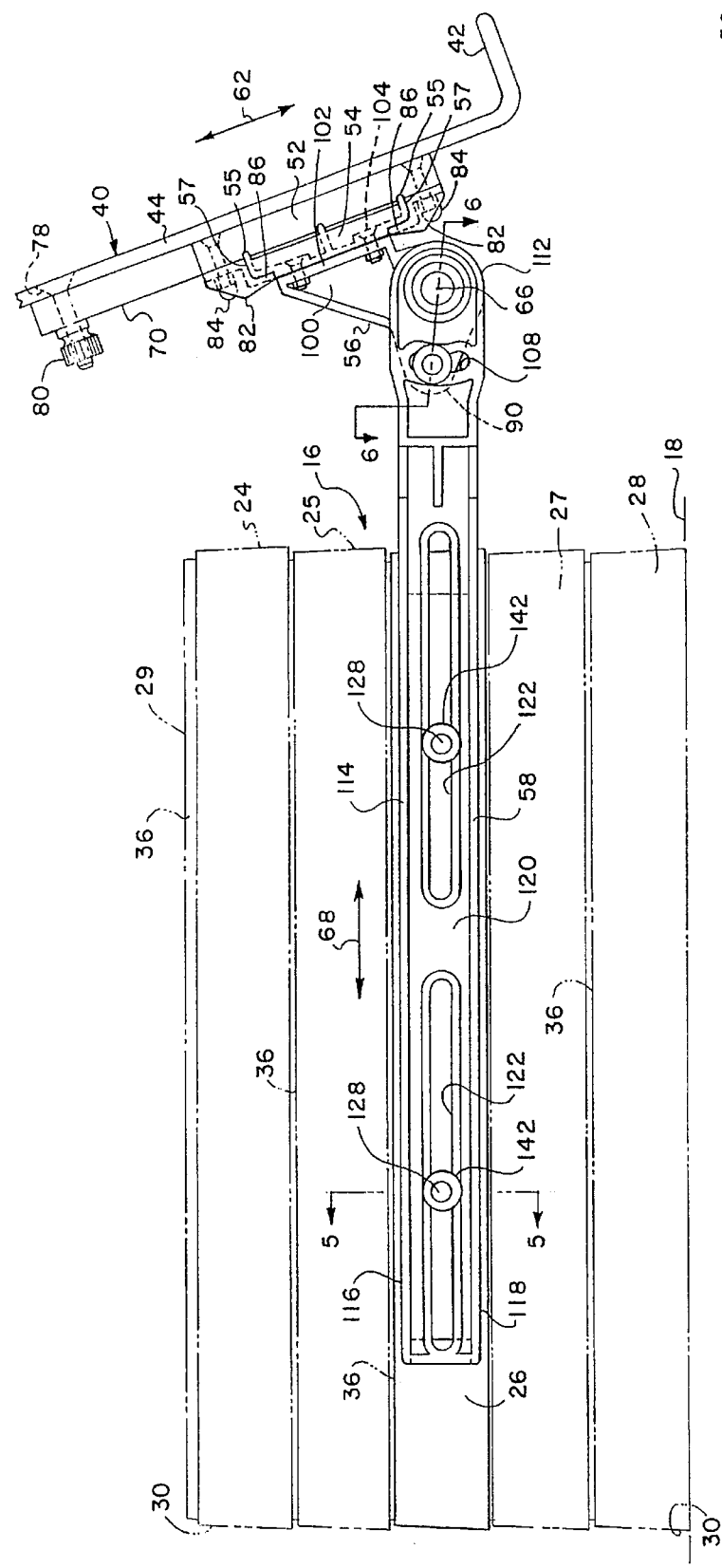
FIG. 4 is a side elevation of the document holder and one of the adjustable support arms therefor.

Referring further to FIG. 3, and also FIG. 4, the easel support bracket 52 includes opposed elongated parallel guide members 82 which may be detachably connected to the support bracket 52 by suitable threaded fasteners 84, one shown in FIG. 3. The guide members 82 include opposed flange portions 86, respectively, which retain the support bracket 52 slidably engaged with the elongated easel support rail 54. As shown in FIG. 4, in particular, the support bracket 52 may be provided with elongated parallel slots 55 which are adapted to receive spaced apart parallel web portions 57 of the support rail 54. Accordingly, the support bracket 52 is guided for lateral movement, side to side, with respect to the display unit 12 by the rail 54 for positioning the easel member 40 laterally along the axis indicated by the arrow 64. The length of the bracket 52 and the rail 54 may be on the order of about fourteen inches giving a range of movement of the easel member 40 of at least fourteen inches while the bracket is adequately supported by the rail 54.

Referring further to FIGS. 3 and 4, opposite ends of the support rail 54 are adapted to be supported by the pivot brackets 56. Each pivot bracket 56 includes a radially projecting boss 90 having a suitable bore 92 formed therein for receiving the shank of a threaded fastener 94, see FIG. 6, also. Each of the pivot brackets 56 further include a cylindrical bore 98 formed therein and a second radially projecting boss 100 supporting a generally planar support flange 102 adapted to be connected to the support rail 54 by suitable fasteners 104. The pivot brackets 56 are adapted to be supported on opposed cylindrical trunnions 106 formed on the support arms 58, as shown in FIG. 3, in particular. The support arms 58 each also include an arcuate slot 108 having an axis of rotation coincident with the axis 66 of the trunnion 106. The fastener 94 of each pivot bracket 56 is adapted to project through the slot 108 on the support arm on which the pivot bracket is mounted with the fastener 94 projecting through the slot and adapted to be connected to a knurled hand-tightenable nut 110, see FIG. 6, also. Accordingly, the pivot brackets 56 are supported on the trunnions 106 for limited pivotal movement about the axis 66 and may be secured in a selected position, delimited by the arc length of the slots 108, by the fastener assemblies 94, 110.

Figure 6:
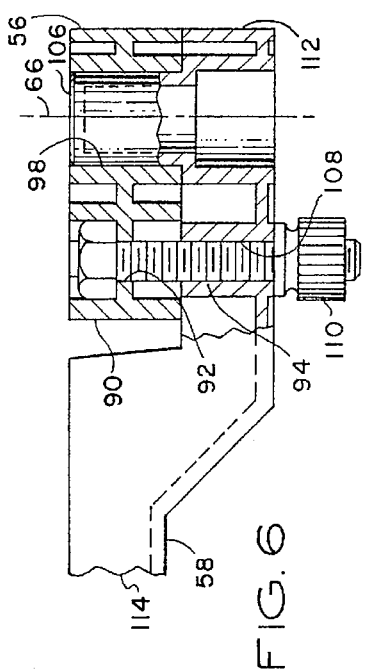
FIG. 6 is a section view taken along the line 6—6 of FIG. 4.
Figure 5:
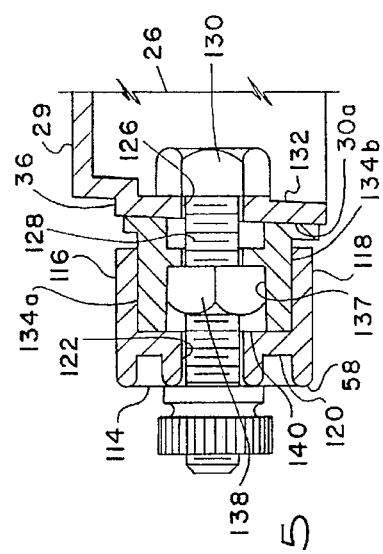
FIG. 5 is a section view taken generally along the line 5—5 of FIG. 4.

Referring further to FIGS. 3, 4 and 5, each of the support arms 58 includes a head portion 112 integrally formed with an elongated guide portion 114 and supporting the trunnion 106, see FIG. 6, also. The guide portion 114 includes opposed generally parallel flanges 116 and 118, see FIG. 5, interconnected by a web 120. The web 120 includes two spaced apart elongated collinear slots 122 formed therein FIG. 4.

Referring further to FIGS. 3 and 5, the pedestal member 26 includes opposed depending sidewall portions 30a and 30b, sidewall portion 30a, shown in FIG. 5, having spaced apart fastener receiving bores 126 formed therein for receiving a threaded fastener 128 having a suitable head portion 130 disposed on the inner side 132 of the sidewall 30a.

The fasteners 128 are adapted to support the respective elongated rail members 59 along each of the sidewalls 30a and 30b, as illustrated. The rail members 59 have opposed parallel rail support surfaces 134a and 134b which are spaced apart a distance slightly less than the distance between the flanges 116 and 118 of the support arms 58. The rails 59 each also include spaced apart hexagonal bores 137, FIG. 5, for receiving a nut 138 threadedly engaged with the fastener 128, as shown, and recessed away from a planar surface 140 of the member 59. The length of the fasteners 128 is sufficient such that they project through the sidewalls 30a and 30b, the support rails 134 and the slots 122 a sufficient distance to permit threaded receipt of respective knurled, hand tightenable nuts 142, similar to the nuts 80 and 110. FIG. 5 is a typical example of how each of four fasteners 128 support the opposed support rails 59 and the support arms 58 slidably mounted on the support rails for movement in a direction corresponding to the double-headed arrow 68.

Accordingly, the support arms 58 may be adjustably supported on the pedestal member 26 for movement of the easel member 40 toward and away from the screen 14 of the video display unit 12 along the axis indicated by arrow 68, and the position of the support arms 58 may be secured by tightening the nuts 142 in a selected position of the easel member 40. The foregoing description indicates that the easel member 40 may be vertically adjusted with respect to the support bracket 52, the easel member and the support bracket 52 may be moved relative to the support rail 54 laterally with respect to the video display unit 12 and the keyboard 22, and the easel member 40 together with the support bracket 52, the support rail 54 and the pivot brackets 56 may be pivotally adjusted about the axis 66 by securing the fasteners 94, 110 in a selected position within the confines of the arc of the slots 108. Still further, the position of the easel member 40 may be adjusted toward or away from the screen 12 along the axis 68 by adjusting the position of the support arms 58 with respect to the pedestal member 26. When a selected position of the support arms 58 is obtained, the nuts 142 are tightened on the fasteners 128 to secure the support arms in a selected position on the rails 134.

Accordingly, the easel member 40 may be adjusted over a wide range of positions with respect to the keyboard 22 and/or the video display unit 12 to optimize the location of documents supported by the easel member 40 with respect to the keyboard and the screen 14 for each keyboard operating person. Although the pedestal member 26 may be formed separately from the support rails 59, those skilled in the art will recognize that the pedestal member may be molded integral with the rails 59, if desired. Also, the pedestal member 26 is stackable on or below adjacent pedestal members as described above.

The assembly and operation of the document holder 10 is believed to be within the purview of one skilled in the art of document holders from the foregoing description. The component parts of the document holder including the support bracket 52, the support rail 54, the pivot brackets 56, the support arms 58, the support rails 50 and the pedestal member 26 may all be formed of injection-molded plastic such as high impact polystyrene. The fasteners described above may be conventional threaded fasteners formed of either plastic or metal. The easel member 40 is preferably formed of transparent plastic, such as clear polycarbonate or clear acrylic.

Certain modifications to the construction of the document holder 10 may be carried out within the scope of the present invention. For example, the support bracket 52 may be modified to have an elongated cylindrical tubular configuration and be slidable in a generally tubular support rail having a suitable slot therein for receiving the support bracket and having opposed end portions which may be pivotally supported on the support arms 58 in place of the pivot brackets 56. Alternatively, the support bracket 52 may also comprise an elongated splined rod suitably mounted in opposed support arms in cooperating splined bores formed therein, respectively. In this way, the easel member 40 would be supported on a splined support bracket which may be slidably moved into and out of the cooperating bores on the support arms and indexed rotatably about the axis 66, for example, to a selected angular position of the easel member 40. Such an arrangement would not have quite the universality of the arrangement of the pivot brackets 56, but would eliminate the requirement for the fasteners for securing the brackets 56 in their selected working positions.

Although a preferred embodiment of the invention has been described in detail hereinabove, those skilled in the art will recognize that other substitutions and modifications may be made to the embodiments shown and described without departing from the scope and spirit of the invention as recited in the appended claims.

What is claimed is:

1. A document holder adapted for use in conjunction with a video display unit, said document holder comprising:

a generally planar easel member having means for supporting a document thereon;

a support bracket for said easel member, said support bracket including means for moving said support bracket and easel member from side-to-side along a lateral axis when positioned in front of a display screen of said video display unit;

a pair of opposed support arms operable to support said easel support bracket for adjustably positioning said easel in a direction toward and away from said display screen; and a support member for said support arms including means cooperable with said support arms for adjusting the position of said support arms in a direction toward and away from said display screen and for securing said support arms in a selected position with respect to said support member.

2. The document holder set forth in claim 1 including:

pivot means interconnecting said support arms and said support bracket for adjusting the position of the plane of said easel member about a generally horizontal axis.

3. The document holder set forth in claim 2 wherein:

said pivot means comprises respective pivot brackets connected to said support bracket and adapted to be pivotally supported on said support arms about a pivot axis in a selected working position.

4. The document holder set forth in claim 3 including:

means for adjusting the position of said pivot brackets about said pivot axis including arcuate slot means formed in said support arms and elongated fasteners extending within said slot means and connected to said pivot brackets, respectively, said fasteners including manually operable fastener members for tightening said pivot brackets in a selected position about said pivot axis.

5. The document holder set forth in claim 3 wherein:

said support arms include opposed trunnions and said pivot brackets include generally cylindrical bores for receiving said trunnions for supporting said pivot brackets on said support, arms.

6. The document holder set forth in claim 3 wherein:

said support bracket includes a rail member supported on said pivot brackets and a slide member slidably disposed on said rail member for side-to-side positioning of said easel member with respect to said video display unit.

7. The document holder set forth in claim 1 wherein:

said support bracket includes means for selectively positioning said easel member in a selected vertical position of said easel member on said support bracket.

8. The document holder set forth in claim 7 wherein:

said means for selectively positioning said easel member includes a pair of opposed slots formed in said support bracket and cooperable fastener means connected to said easel member and said support bracket for selectively positioning said easel member with respect to said support bracket in a selected vertical position.

9. The document holder set forth in claim 1 including:

a pedestal member for supporting said support arms, said pedestal member including a peripheral depending sidewall portion, and opposed support rails disposed on said sidewall portion and operable to support said support arms for selective positioning of said support arms and said easel member with respect to said pedestal member.

10. The document holder set forth in claim 9 wherein:

said video display unit is supported on a pedestal comprising plural pedestal members vertically stacked on each other in nested relationship, said pedestal member for supporting said support arms comprising one of said pedestal members of said pedestal.

11. The document holder set forth in claim 9 wherein:

said support arms are each slidably positionable on said pedestal member and are secured on said pedestal member in a selected working position by fastener means supported by said pedestal member and extending through slot means formed in said support arms, said fastener means including threaded nut members adapted to engage one of said pedestal member and said support arm for securing said support arm with respect to said pedestal member in a selected working position.

12. The document holder set forth in claim 11 wherein:

said support rails are supported on said pedestal member by said fastener means for securing said support arms in said selected working position, respectively.

13. A document holder for use in conjunction with a computer work station including a video display unit, said document holder comprising:

a generally planar easel member having means for supporting a document thereon;

support means for said easel member for selectively positioning said easel member along an axis standing laterally from side to side when said easel member is placed in front of a display screen of said video display unit, said support means including means for positioning said easel member generally vertically with respect to said screen, and said support means including means for positioning said easel member in a selected position toward or away from the plane of said screen and along an axis substantially normal to the axis providing for side-to-side positioning of said easel member.

14. The document holder set forth in claim 13 including:

a pedestal member for supporting said document holder including said means for supporting said document holder for movement toward and away from said display screen, said pedestal member including means for supporting said video display unit thereon.

15. The document holder set forth in claim 14 wherein:

said means for positioning said easel member in a working position toward and away from said screen includes opposed support arms operable to support said easel member for positioning said easel member in a direction toward and away from said screen, said support arms being supported on said pedestal member.

16. The document holder set forth in claim 15 including:

pivot means interconnecting said support arms and said easel member for adjusting the position of said easel member about a tilt axis generally parallel to said axis generally parallel to said axis which provides for side-to-side lateral movement of said easel member.

17. The document holder set forth in claim 16 wherein:

said pivot means comprises spaced apart pivot brackets connected to said support arms and to a support bracket for said easel member and adapted to be pivotally supported on said support arms about a pivot axis.

18. The document holder set forth in claim 17 including:

means for adjusting the position of said pivot brackets about said pivot axis including arcuate slot means formed in one of said support arms and said pivot bracket and elongated fasteners extending within said slot means and connected to one of said support arms and said pivot brackets, respectively, said fasteners including manually operable fastener members for tightening said pivot brackets in a selected position of said easel member about said pivot axis.

19. The document holder set forth in claim 17 wherein:

said support arms include opposed trunnions and said pivot brackets include generally cylindrical bores for receiving said trunnions for supporting said pivot brackets on said support arms.

20. A document holder for use in conjunction with a video display unit, said document holder comprising:

a generally planar easel member having means for supporting a document thereon;

a support bracket for said easel member, said support bracket including means for adjusting the vertical position of said easel member with respect to said support bracket;

a support rail for said support bracket operable to support said support bracket for sliding movement along a lateral axis for moving said easel member from side to side when said document holder is positioned in front of a display screen of said video display unit;

pivot means connected to said support rail and to opposed support arms of said document holder for moving said support bracket and said easel member about a pivot axis to tilt said document with respect to the plane of said display screen to a selected working position of said easel member; and means for supporting said support arms for movement along an axis substantially normal to said pivot axis for positioning said easel member in a selected working position toward and away from said screen.

* * * * *